Nov. 8, 1927.  F. D. WILLIAMS  1,648,094

LUGGAGE CARRIER FOR MOTOR ROAD VEHICLES

Filed Aug. 31, 1926

F. D. Williams, inventor

Patented Nov. 8, 1927.

1,648,094

UNITED STATES PATENT OFFICE.

FREDERICK DREW WILLIAMS, OF SYDNEY, NEW SOUTH WALES, AUSTRALIA.

LUGGAGE CARRIER FOR MOTOR ROAD VEHICLES.

Application filed August 31, 1926, Serial No. 132,822, and in Australia April 1, 1926.

This invention relates to luggage carriers for motor-road vehicles and has for its object to provide a luggage carrier of simple and cheap construction; adapted to be folded or to be opened for use when required; and also adapted to allow ready removal from or replacement to the rear of a vehicle of a spare tire or wheel.

Figure 1:
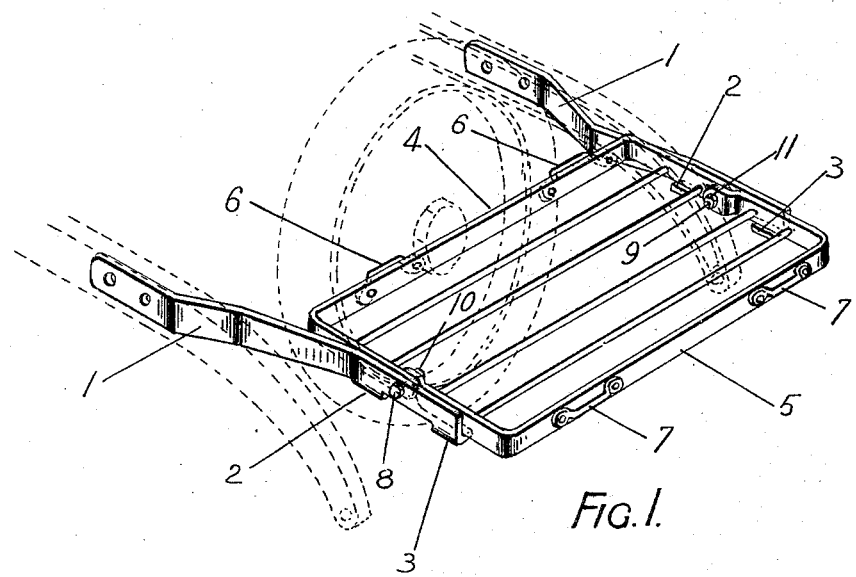
Figure 2:
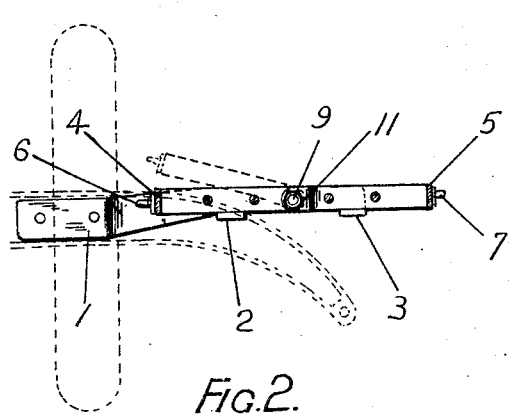
Figure 3:
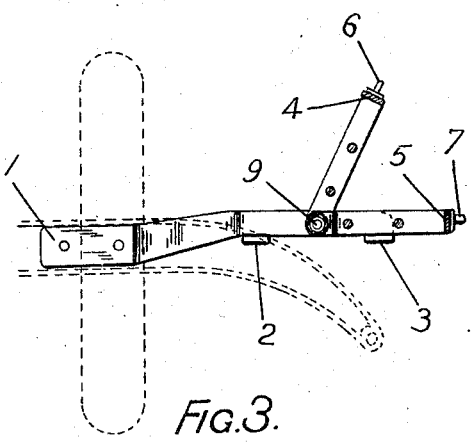

Referring to the accompanying drawings in which the invention is illustrated, Fig. 1 is a perspective view of the luggage carrier attached to the rear of a chassis of a motor-road vehicle; Fig. 2 side view of the carrier fully extended for use; and Fig. 3 similar side view, but showing the carrier with one of its parts raised upwardly.

The luggage carrier is connected to the rear of the chassis of a motor road vehicle by means of brackets 1 of any suitable design. Such brackets are furnished at the bottom thereof with stop lugs 2 and 3 for the respective foldable carrier frame members 4 and 5. The said frame members may be of any preferred design; as shown in the drawings they consist of bent elements with transverse bars. On the bent elements strap loops 6 and 7 may be provided.

To enable the frame members 4 and 5 to be folded onto each other, or to be extended in relation to each other to serve as a luggage carrier, or to permit the member 4 to be turned upwardly (Fig. 3) in relation to the member 5 each of the members 4 and 5 are pivotally connected to the bolts 8 and 9 which are respectively secured by the nuts 10 and 11 to the bent elements of the said members 4 and 5 and the brackets 1.

When the members 4 and 5 are extended as shown in Fig. 1 the carrier is adapted to have luggage secured thereto in suitable manner, and when it is desired to remove or replace a spare tire at the rear of the vehicle it is only necessary to move the member 4 to raised position when the spare tire may be readily removed or replaced on the vehicle. If desired the member 4 may be folded over the member 5 or such members may be folded in opposite order.

What I claim as my invention and desire to secure by Letters Patent is:—

1. A luggage carrier for motor-road vehicles comprising brackets having their inner ends connected to the vehicle and projecting laterally therefrom, a frame including a pair of members, pivotal means extending to opposite points of each of the brackets and transversely engageable with the inner ends of each of the frame members for pivotally connecting the frame members to the brackets, and separate stop means at the lower edge of each of said brackets for each of said frame members.

2. A luggage carrier for motor-road vehicles according to claim 1, in which the pivotal means consist of bolts and the hinging of the frame members is centrally of the luggage carrier, the bolts and the frame members being securable by nuts.

3. A luggage carrier for motor-road vehicles comprising a pair of frames consisting of bent elements with spaced transverse bars, a bracket attachable at one end thereof to the rear of one side of the vehicle, a bracket attachable at one end thereof to the rear but opposite side of the vehicle, a pivotal bolt on each said bracket for the hinging thereto of the inner ends of the said elements, securing nuts fitting said bolts, loop means on the elements whereby straps are attachable thereto and stop lugs on the bottoms of the brackets serving as supports for the frames thereon.

In testimony whereof I affix my signature.

FREDERICK DREW WILLIAMS.